United States Patent [19]

Suzuki

[11] 4,202,491

[45] May 13, 1980

[54] DATA CARD

[75] Inventor: Atsushi Suzuki, Hachioji, Japan

[73] Assignee: Hitachi, Ltd., Japan

[21] Appl. No.: 836,616

[22] Filed: Sep. 26, 1977

[51] Int. Cl.² .................. G06K 19/06; G06K 7/10; H03F 1/22; G11B 1/00

[52] U.S. Cl. ................ 235/491; 331/94.5 F; 235/468; 250/365

[58] Field of Search ............ 235/491, 468, 465, 469; 427/64, 65, 66, 70; 250/372, 566, 568, 569, 570, 365; 340/149 A; 331/94.5 F

[56] References Cited

U.S. PATENT DOCUMENTS

| Re. 27,770 | 10/1973 | Siegel | 235/468 |
|---|---|---|---|
| 3,279,826 | 10/1966 | Rudershausen | 235/491 |
| 3,316,500 | 4/1967 | Newman | 331/94.5 F |
| 3,355,675 | 11/1967 | Varsanyi | 331/94.5 F |
| 3,473,027 | 10/1969 | Freeman | 250/365 |
| 3,536,894 | 10/1970 | Travioli | 235/468 |
| 3,668,079 | 6/1972 | Diamond | 427/64 |
| 3,719,901 | 3/1973 | Monchamp | 331/94.5 F |
| 3,725,811 | 4/1973 | Murphy | 331/94.5 F |
| 3,763,356 | 10/1973 | Berler | 235/491 |
| 3,786,237 | 1/1974 | Postal | 235/468 |
| 3,829,662 | 8/1974 | Furahashi | 340/149 A |
| 3,919,447 | 11/1975 | Kilmer | 235/491 |
| 3,933,094 | 1/1976 | Murphy | 235/491 |
| 3,946,203 | 3/1976 | Hecht | 235/491 |
| 3,975,098 | 8/1976 | West | 250/365 |

Primary Examiner—Robert M. Kilgore
Attorney, Agent, or Firm—Craig and Antonelli

[57] ABSTRACT

A data card wherein various data are recorded with a fluorescent material which emits infrared rays when excited by infrared rays is disclosed.

The data card according to this invention has such merit that it is very effective for the preservation of secrecy and the prevention of forgery, that it is not affected by stains, that different information can be recorded thereon one over the other, and that it can be read by an extraordinarily compact reader.

17 Claims, 8 Drawing Figures

DATA CARD

BACKGROUND OF THE INVENTION

1. Field of the Invention

This invention relates to data sheets, and more particularly to a data sheet which is effective for the preservation of secrecy and the prevention of forgery and which makes it possible to miniaturize a reading device.

2. Description of the Prior Art

For example, a cash card employed in a bank or the like, and a credit card, railway ticket, admission ticket, bond, pari-mutuel ticket, etc. are designed such that characters, numerals, symbols, diagrams, patterns, etc. (in this specification, these shall be generically named "date," and a piece of paper, plastic film, cloth or the like on which the data are recorded shall be called a "data card") are entered in a predetermined blank form in advance. In use, the entered data are read by magnetic means, optical means or the like, and a predetermined decision is reached on the basis of the result.

A large number of types of data cards have hitherto been proposed.

The most typical data card is one in which data are recorded by a magnetic method. With this data card, desired data are encoded in a magnetic powder film applied on the front or rear surface of the card, while the reading is carried out by a magnetic method. The data card of this type is most widely employed for a credit card, a railway ticket, etc. Since, however, the information recorded magnetically can be seen with the eye or be transferred through proper means, the preservation of secrecy and the prevention of forgery are difficult. In addition, since the information registered magnetically can be easily erased by a magnetic field, the card is not adopted for uses requiring a high degree of reliability.

There has been proposed the card according to which data are entered on a card surface by the use of a fluorescent material in advance and are read with irradiating the card by ultraviolet rays so as to cause the fluorescent material to emit visible light (Japanese Utility Model Application Public-disclosure No. 117799/1974). However, a large-sized lamp is necessary for generating the ultraviolet rays. Moreover, the life of the mercury-arc lamp is problematic. Another drawback is that, since the visible light is given forth, the forgery or alteration is highly feared.

There has also been a data card of the system in which data are read by irradiating the surface of the card by light (visible light or infrared rays) and exploiting the difference of the light reflection factors of parts with data written down and the remaining part. Such a data card is extensively employed for the sorting of postal matter, etc. However, when a crease exists in the card or stains exist on the surface, the light reflection factor lowers and there is the likelihood of misconception. The preservation of secrecy is also questionable.

There has also been a data card in which holes piercing the card are provided, data being represented by the number or positions of the holes. It is disadvantageous, however, in that since the number or positions of the holes can be easily confirmed with the bodily eye, another person can readily counterfeit the card.

Many other data cards have been proposed, including one according to which a very small amount of radioactive substance is mixed in ink to be used for the recording of data so as to detect it by means of a Geiger counter (Official Gazette of Japanese Pat. No. 11380/1970), or one according to which a colored dielectric layer is provided, data being entered thereon by electrostatic recording (Official Gazette of Japanese Utility Model No. 16560/1975). None of them, however, is satisfactory, and a more excellent data card is strongly desired.

SUMMARY OF THE INVENTION

An object of this invention is to eliminate the disadvantages of the prior-art data cards and to provide a data card which is not affected by stains, creases etc., which is not easily forged or altered, which assures the preservation of secrecy and with which entered data can be reliably and easily read by a small-sized reader.

In order to accomplish the object, this invention enters data by the use of an infrared rays excited-infrared rays emitting fluorescent material.

DETAILED DESCRIPTION

Figure 1:
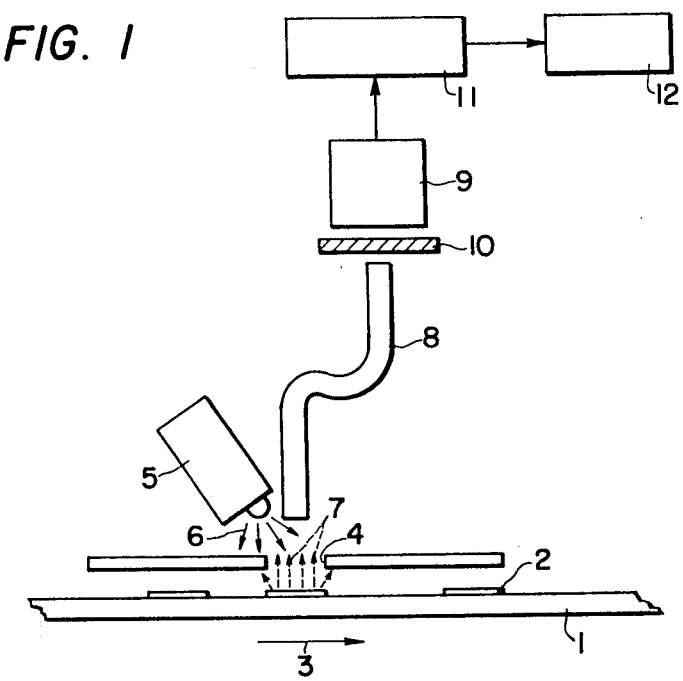
FIG. 1 is a view for explaining a method for reading data recorded on a data card according to this invention.

The data card according to this invention is such that various data are recorded on or in a support made of paper, plastic film or the like by the use of a fluorescent material which is excited by infrared rays and gives forth infrared rays (hereinbelow, written as "infrared-infrared fluorescent material").

Since the infrared-infrared fluorescent material itself is substantially white and infrared rays cannot be sensed with the eye, the data card in which data are recorded with such fluorescent material is very effective for the preservation of secrecy and the prevention of forgery when, by way of example, the data are registered on a white blank form with the fluorescent material.

Regarding a reader for reading the data recorded on the data card according to this invention, an infrared light emitting diode of small size and long life can be employed as an exciting source, and a solid-state device of, for example, PbS or Si which has a satisfactory sensitivity at the room temperature can be employed as a receptor or light receiving device. Therefore, a small-sized reader of high reliability is formed.

Such merits of this invention are, of course, brought forth from the fact that the data are registered with the infrared-infrared fluorescent material. Further, when the infrared-infrared fluorescent material to be used fulfills the following three conditions, the merits of this invention become more remarkable, and an extraordinarily excellent data card is formed.

(1) Sharp absorption and emission are exhibited only at specific wavelengths.

(2) The absorption intensity is high.

(3) The luminous efficiency is high.

Since the infrared-infrared fluorescent materials do not have wide applications, they have heretofore been scarcely investigated, and only substances much smaller in number than other types of fluorescent materials have been known.

The infrared-infrared fluorescent materials which satisfy the aforecited three conditions best and which yield very favorable results in practical use can be classified into the following four sorts:

(1) Fluorescent material containing neodymiun (Nd).
(2) Fluorescent material containing Nd and ytterbium (Yb).
(3) Fluorescent material containing Yb and erbium (Er).
(4) Fluorescent material containing Nd, Yb and Er.

The fluorescent material containing Nd absorbs intensely the light of wavelengths near 800 nm owing to the transition of $Nd^{3+}$ as represented by $^4I_{9/2} \rightarrow {}^4F_{5/2}$, and emits light having a peak near a wavelength 1,050 nm owing to the transition represented by $^4F_{3/2} \rightarrow {}^4I_{11/2}$.

Accordingly, data registered with this fluorescent material can be easily and accurately read by a detection unit wherein an exciting source which is made of a GaAlAs infrared light emitting diode having its emission center wavelength at 800 nm and an infrared rays detector which employs Si (and the measuring wavelength range of which is substantially from 1,000 to 400 nm) are combined with an appropriate filter.

Figure 2:
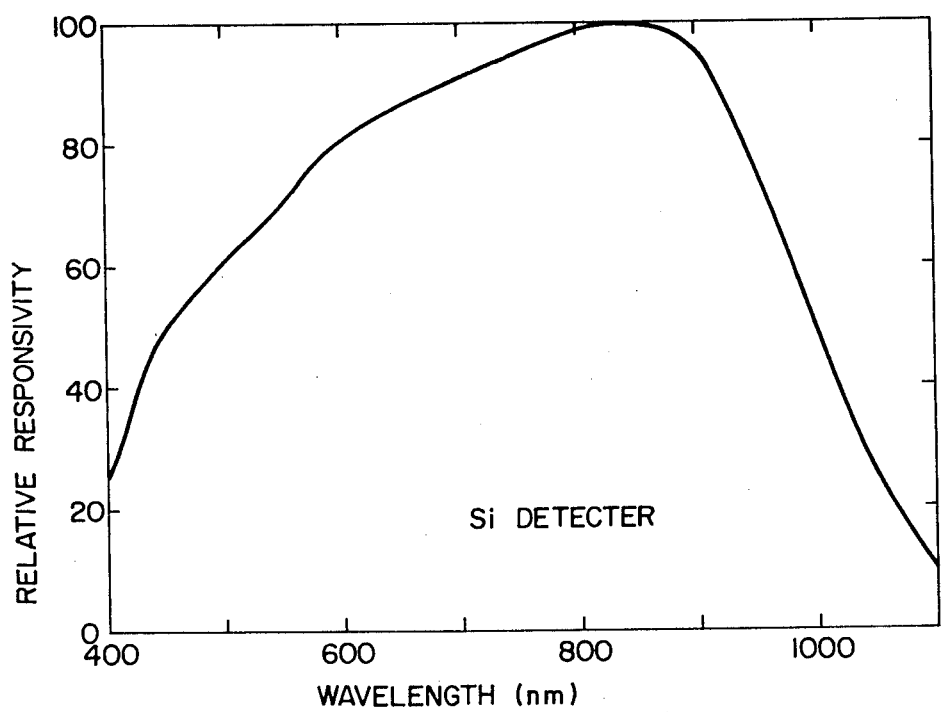
FIGS. 2 and 3 are graphs showing the sensitivity curves of Si and PbS detectors, respectively.

In case of the fluorescent material containing Nd and Yb, Nd ions absorb the exciting light, the absorbed energy is transmitted to Yb ions to execute light emission based on the transition of $^2F_{5/2} \rightarrow {}^2F_{7/2}$, and the peak wavelength of the light emission is approximately 980 nm. As the exciting source, accordingly, the GaAlAs infrared light emitting diode can be used as in the above case. The responsivity of the infrared rays detector employing Si has a peak near 800–900 nm as shown in FIG. 2. Therefore, the matching of this fluorescent material with the Si receptor is better than that of the fluorescent material exploiting the light emission based on Nd, so that a greater output can be produced when recorded data are read.

In the fluorescent material containing Yb and Er, light is absorbed by an intense absorption band near 970 nm corresponding to the transition of Yb as represented by $^2F_{7/2} \rightarrow {}^2F_{5/2}$, and energy absorbed in that case is transmitted to Er to emit light (the emission peak of which lies at about 1,540 nm) corresponding to the transition expressed by $^4I_{13/2} \rightarrow {}^4I_{15/2}$.

Figure 3:
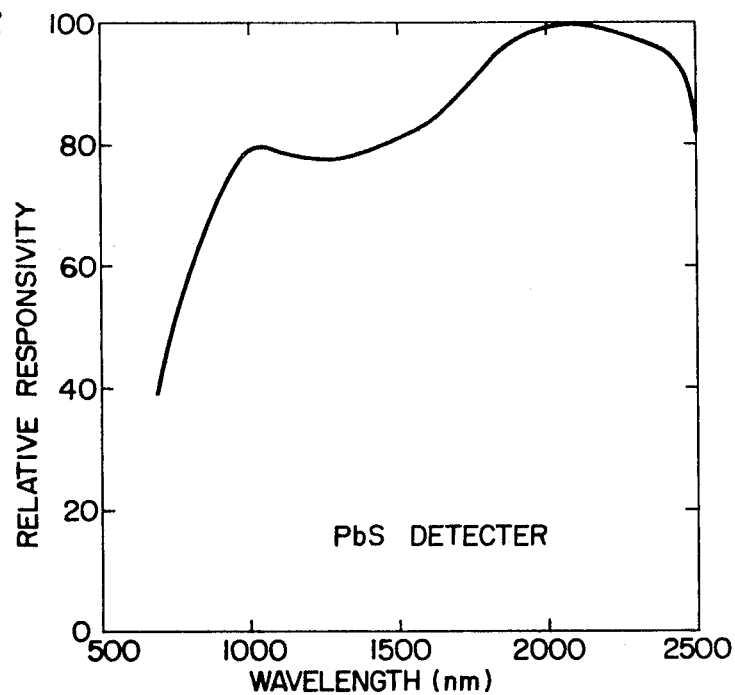

Accordingly, in order to read data out of a data card employing this fluorescent material, a GaAs (Si) light emitting diode having its emission center wavelength near 940 nm may be employed as the exciting source, while as the detection unit a PbS receptor which exhibits a sufficiently high responsivity to the light emission based on Er as illustrated in FIG. 3 may be used in combination with an appropriate filter.

The fluorescent material containing Nd, Yb and Er absorbs intensely light near a wavelength 800 nm owing to Nd, and transmits energy acquired in this case to Yb and Er in succession, to emit light having its emission peak at 1,540 nm.

For the reading of data in this case, accordingly, the GaAlAs light emitting diode is suitable as the exciting source, and the PbS receptor as illustrated in FIG. 3 is suitable as the detector.

As the fluorescent materials in this invention, various fluorescent substances can be used singly or in the form of a mixture consisting of two or more thereof. For example, they include (1) materials in which Nd, Yb, Er etc. as activators are added to various parent substances, (2) compounds which contain Nd, Yb, Er etc. as their constituent elements, and (3) chelate compounds which contain Nd, Yb, Er etc.

As the materials (1), there are for example $CaWO_4:R_E$, $SrWO_4:R_E$, $Ca_{10}(PO_4)_6F_2:R_E$, $Y_3Al_5O_{12}:R_E$, $SrMoO_4:R_E$, $CaF_2:R_E$, etc., and almost all the parent substances of fluorescent materials presently employed can be used as the parent substances of the fluorescent materials in this invention. ("$R_E$" denotes the combination of Nd, Yb, and/or Er as described above.)

As the materials (2), there are a large number of compounds, for example, phosphates, borates, tungstates etc. of $R_E$ such as $R_EP_5O_{14}$, $R_ELiP_4O_{12}$, $R_ENaP_4O_{12}$, $R_EKP_4O_{12}$, $R_EAl_5B_4O_{12}$ and $R_ENa_5W_4O_{12}$. Part of $R_E$ may be substituted by elements as described later.

The chelate compounds (3) dissolve easily in water and form true solutions. They therefore bring forth the advantage that the recording is facilitated extraordinarily and that a very thin application is permitted.

As previously explained, these infrared-infrared fluorescent materials have the uses much limited as compared with other types of fluorescent materials, and hence, only a small number of fluorescent substances have been developed. In particular, the chelate compounds of neodymium etc. have been developed quite recently and have not been put into practical use yet.

Substances other than the chelate compounds are described in, for example, the following literatures. In all these cases, however, they are employed for solid-state devices for laser oscillation in the form of single crystal. Any example in which they are used as powdery infrared-infrared fluorescent materials is not disclosed.

(1) "Luminescence of Insulating Solid for Optical Masers," L. G. Van Vitert in Luminescence of Inorganic Solids, ed. by Paul Goldberg pp. 465–539, Academic Press 1966.

(2) "Minilasers of Neodymium Compounds," Laser Focus, May 1976, pp. 64–69, S. R. Chinn, H. W. P. Hong and J. W. Pierce.

(3) "Stoichiometric Laser Materials," H. Danielmeyer in Festkörperproblem XV, p. 253, 1975, Viehweg (West Germany).

The quantities of Nd etc. to be contained in the infrared-infrared fluorescent materials for use in this invention are somewhat different in dependence on the sorts of the fluorescent materials.

In the fluorescent materials in which activators of Nd etc. are incorporated in parent substances, cation elements other than those constituting oxygen acid can be substituted by Nd etc. in an amount of 1–50 atomic-%. Especially favorable results are yielded when the amount of the substitution is 1–10 atomic-%. By way of example, in case where the parent substance is $SrMoO_4$, 1–50 atomic-% of strontium may be substituted by neodymium etc.

In case of the fluorescent materials containing Nd etc. as their constituent elements, when the quantities of neodymium etc. lie within a range of 2–100 atomic-% as cation elements other than those constituting oxygen acid, this invention is applicable. When the quantities are 10 atomic-% or more, very favorable results are yielded. By way of example, in case of $NdP_5O_{14}$, 90–0 atomic-% of neodymium may be substituted by other cation elements to be stated later.

Also fluorescent materials wherein, in the fluorescent materials for use in this invention, part of Nd, Yb and/or Er is substituted by a trivalent cation element which exhibits no absorption from the vicinity of 800 nm to the vicinity of 1,600 nm, such as yttrium (Y), scandium (Sc), lanthanum (La), gadolinium (Gd), lutecium (Lu), cerium (Ce) and bismuth (Bi), have the features mentioned above. They can produce favorable results when employed for a data card.

In order to record data with the foregoing fluorescent materials, a variety of methods are possible.

For example, the fluorescent material is mixed with a resin, a plasticizer and a solvent to prepare printing ink, with which data are recorded according to a conventional printing process. This method can record, not only characters, but also various patterns, and is suitable to fabricate a large number of data cards with identical data recorded thereon.

It is also possible to transfer characters onto a predetermined card in such a way that an elongate tape is coated with the above printing ink, that the tape surface coated with the printing ink is arranged in contact with the card, and that the tape is strongly hit with printing types from the opposite surface of the tape. This is the same method as the conventional entry with a typewriter, and is suited to enter different data into different cards.

When the particles of the fluorescent material are very fine or when the true solution of the fluorescent material can be formed, data can be entered by the use of a pen or a writing brush. This method is convenient in practical use because, in issuing data cards, different data can be entered without a typewriter or a printing machine.

In the data cards formed by the above methods, the data are recorded in the shape of a thin film of the fluorescent material deposited on paper or the like. Accordingly, when the data card is used for long, it is feared that the fluorescent material will gradually exfoliate due to friction or bending. In case where the data is entered by the use of the true solution of the fluorescent material, such troubles rarely occur. The exfoliation of the fluorescent material can be perfectly prevented by covering the surface of the data card with a protective film such as plastics film. Moreover, when a film which is substantially opaque to visible rays is used as the protective film, it becomes quite impossible to read the data with the eye, and this is very convenient for the preservation of secrecy and the prevention of alteration. The colors of the fluorescent materials for use in this invention are substantially white. Therefore, when data are entered on white paper by the use of the fluorescent material, the reading of the data with the eye is very difficult, and the data card is satisfactory for ordinary purposes. In this respect, the reading with the eye can be made quite impossible by using the above-mentioned protective film.

Although any of the data cards formed by the above methods has the data entered on a supporter (of paper, plastics or the like), data can also be entered by arranging the fluorescent material within the supporter. More specifically, in molding a plastics film, the fluorescent material is added so that it may be arranged at a predetermined position in the plastics film. Then, a data card made up of the plastics film in which data are entered in the interior, not on the surface, is formed. Also in this case, it is possible by such means as coloration to render the plastics film opaque to the visible light and to render the data unreadable with the eye.

As the supporting materials for the data card according to this invention, sheets of a large number of materials such as cloth, rubber and metal can of course be used in addition to the paper and the plastics film.

In order to read the data recorded on or in the data card according to this invention, many methods can be employed. A typical reading method is illustrated in FIG. 1.

While moving a data card 1 in the direction of arrow 3, the data card 1 is irradiated by infrared rays 6, given forth from an infrared light emitting diode 5, through a slit 4. When data 2 are disposed under the slit 4, the infrared-infrared fluorescent material emits infrared rays 7, differing in wavelength from the infrared rays 6, owing to the irradiation by the exciting infrared rays 6. The emitted infrared rays 7 are introduced into a detector 9 by a glass fiber 8. Since a filter 10 is placed in front of the detector 9, only light of wavelengths favorable for the wavelength characteristics of the detector is guided to the detector 9. Further, a signal is fed to a display or decision device 12 by an arithmetic circuit 11.

Of course, the infrared light emitting diode 5, the filter 10 and the detector 9 are appropriately selected in dependence on the kind of the infrared-infrared fluorescent material.

EXAMPLE 1

Printing ink was prepared in such a way that 200 gr of powder of a yttrium aluminum garnet fluorescent material activated with neodymium ($Y_3Al_5O_{12}$:Nd) was mixed well with 160 gr of a vinyl chloride series resin, 40 gr of a plasticizer (dioctyl phthalate) and 400 gr of a solvent (methyl isobutyl ketone).

Using this printing ink, a liner pattern 0.5 mm wide and 2 mm long was printed on predetermined paper. Further, predetermined items were entered with a typewriter. Thus, an identification card was fabricated.

Since the fluorescent material is white, it is extremely difficult to detect the presence of the liner pattern with the eye under ordinary illumination.

The identification card was irradiated by infrared rays (emission center wavelength: 800 nm) given forth from a GaAlAs infrared light emitting diode, and the presence of the linear pattern was detected by a detection unit which comprised in combination a filter made by lapping polycrystalline InP and a silicon photodiode. Then, misreading occurred once or less to 10,000 times.

EXAMPLE 2

An $NdLiP_4O_{12}$ fluorescent material was finely pulverized into an average grain diameter of 3 μm by a ball mill. To 20 parts (by weight) of the fluorescent material, there were added and mixed 6 parts of a cellulose acetate resin, 14 parts of a plasticizer (dioctyl azelate) and 35 parts of a solvent (methylethyl ketone). Thus, ink was prepared.

This ink was applied on a polyester thin film to a thickness of 20 μm, to make a type ribbon for transfer. Using this type ribbon, data were printed on paper with a typewriter. Thus, a data card was fabricated.

The reading of the data entered on the data card was carried out by means of a reader of the construction wherein GaAsAl infrared light emitting diode having its emission peak at 800 nm was employed as an irradiation source and wherein infrared rays given forth by the fluorescent material were detected by guiding them to the light receiving surface of a silicon photodiode with an optical fiber. The percentage of correct answers of the reading results was above 99.9%. Besides, since the intensity of emission by the fluorescent material was high, it was unnecessary to conduct the reading in a dark room and the data could be read under illumination by a fluorescent lamp.

EXAMPLE 3

Using $Nd_{0.85}Yb_{0.15}P_5O_{14}$ as a fluorescent material, a type ribbon was fabricated by the same method as in Example 2. Also by the same methods as in Example 2, the entry and reading of a data card were executed.

Both the time constants of the rise and decay of light emission by data (bar codes) entered with ink containing the fluorescent material were about 1 msec, and the data card on which the data were entered with the ink was read at a speed of 100 cm/sec.

The data card has the bar codes 0.5 mm wide entered thereon at pitches of 2 mm, so that when it is read at 100 cm/sec, the bar codes are read at a rate of 500 codes/sec. The percentage of correct answers of the reading was 99.9%.

EXAMPLE 4

As explained before, the fluorescent materials for use in this invention vary in the wavelengths of excitation light and/or emission light in dependence on the sorts of ions absorbing the exciting light (absorbing ions) and ions emitting the light owing to transmitted energy (light emitting ions).

Accordingly, by employing two or more sorts of infrared-infrared fluorescent materials of different characteristics and appropriately selecting the exciting sources and the light receptors, it is possible to record two or more pieces of data on an identical card one over another and to read the two or more pieces of recorded data in a respectively separated manner. This is impossible with the prior-art data cards employing the prior-art recording methods such as magnetic recording, and forms one of important merits of this invention.

Using $LiNd_{0.9}Yb_{0.1}P_4O_{12}$ (hereinafter, written as "Nd-Yb fluorescent material") as a fluorescent material, a type ribbon was made in conformity with the same method as in Example 2. Coded data A were recorded as in Example 2. Likewise, a type ribbon was made by the use of $LiYb_{0.98}Er_{0.02}P_4O_{12}$ (hereinafter written as "Yb-Er fluorescent material"), and different data B were recorded on the identical card in a manner to lie over the data A.

In order to read the data A, a GaAlAs light emitting diode was employed as the exciting source, and an Si light receptor combined with an InP polycrystal filter was used as a light receiving unit.

On the other hand, in order to read the data B, an exciting source constructed of a GaAs(Si) light emitting diode and a light receiving unit constructed of a PbS photodetector and an interference filter were employed.

Figure 4A:
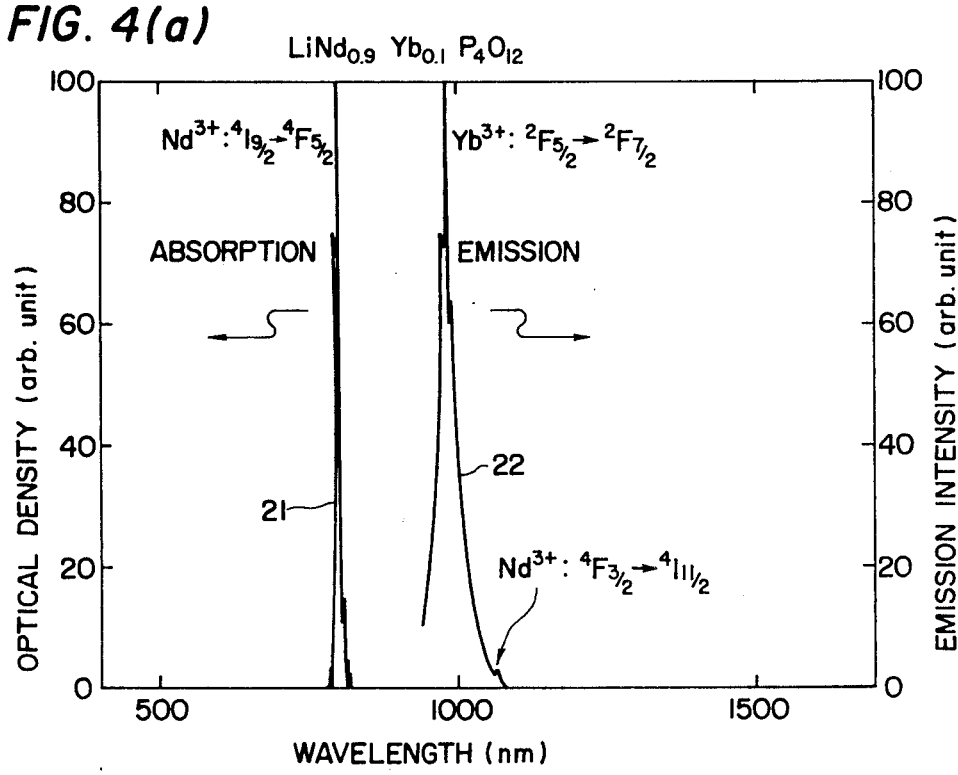
FIGS. 4(a) to 4(d) are characteristic diagrams showing absorption and emission spectra employed in this invention, the emission spectrum of an infrared light emitting diode, and a sensitivity curve in the case of combining a solid-state photodetector and a filter.
Figure 4B:
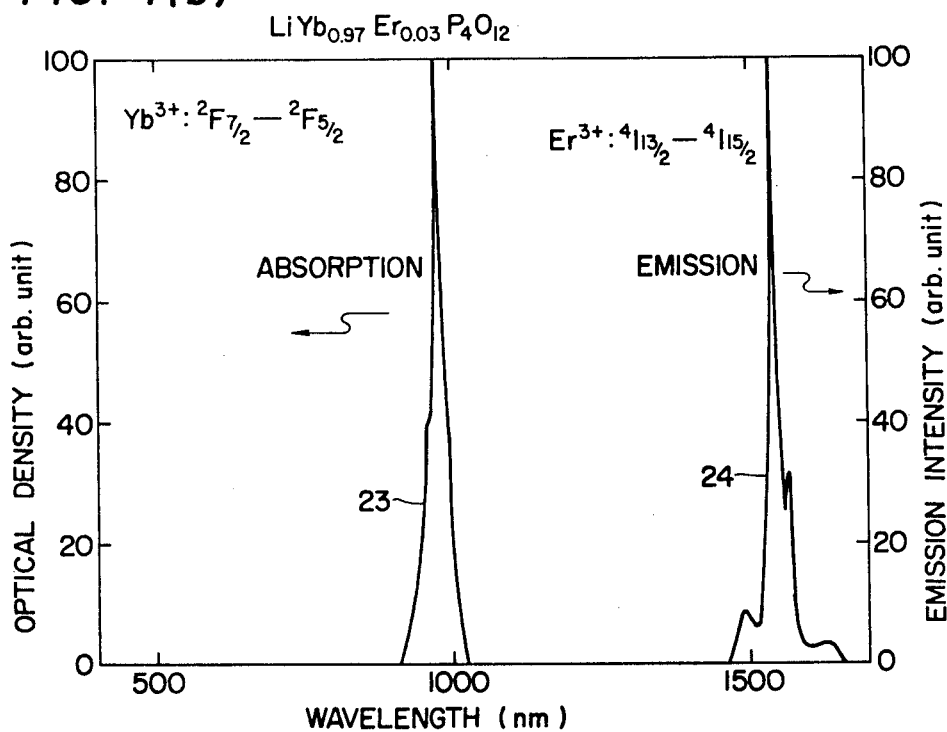

In FIG. 4(a), spectra 21 and 22 are the absorption spectrum and emission spectrum of the Nd-Yb fluorescent material respectively. In FIG. 4(b), spectra 23 and 24 are the absorption spectrum and emission spectrum of the Yb-Er fluorescent material respectively.

Figure 4C:
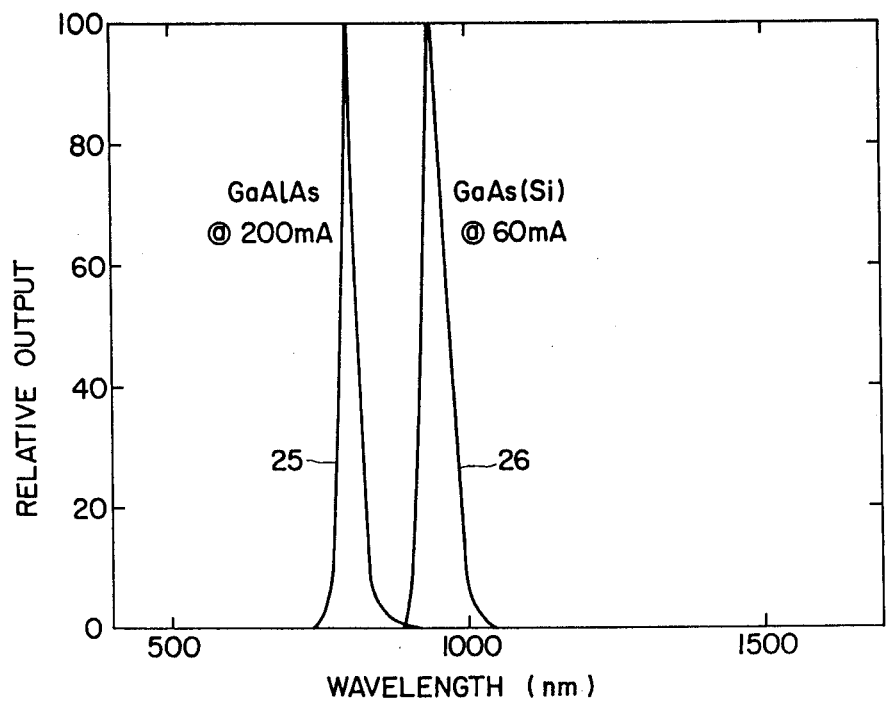

In FIG. 4(c), spectra 25 and 26 are the emission spectra of the GaAlAs and GaAs(Si) light emitting diodes respectively.

Figure 4D:
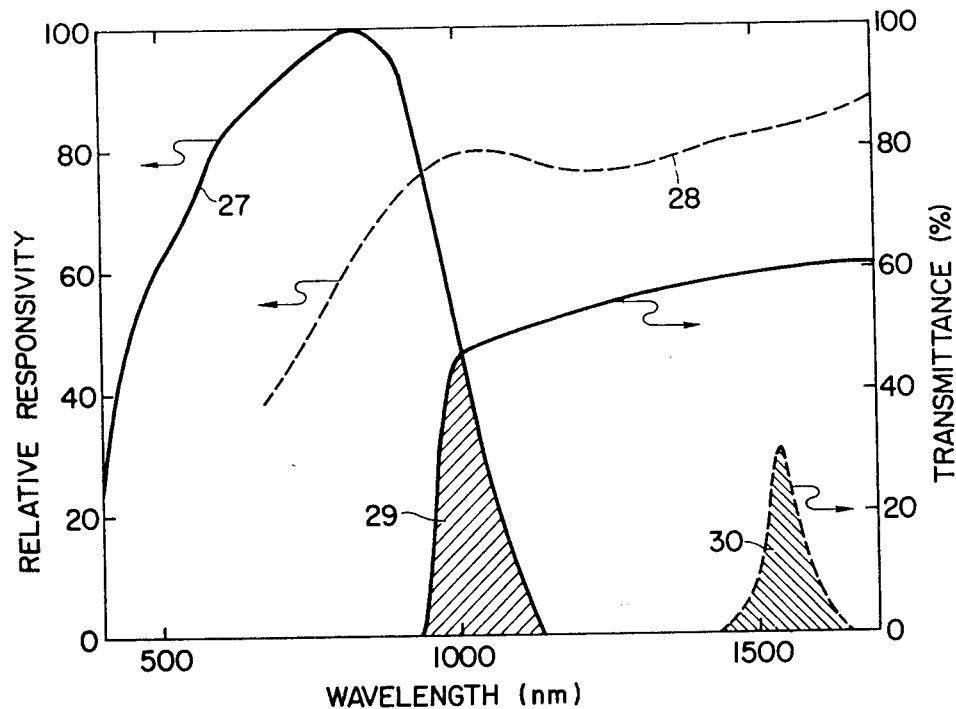

In FIG. 4(d), curves 27 and 28 are the responsivity curves of the Si and PbS light receptors respectively. Hatched regions 29 and 30 are the responsive regions in the cases of jointly using the InP polycrystal filter and the interference filter, respectively.

As apparent from FIGS. 4(a)–4(d), the data A recorded with the Nd-Yb fluorescent material can be read out only in case where the specific exciting source and light receptor are used in combination, and they are unreadable in any other case. The same applies to the data B recorded with the Yb-Er fluorescent material.

It is accordingly possible that a plurality of sorts of data are recorded on a single card one over another or that one sort of data are divided into groups, which are recorded with respectively different fluorescent materials, and that the contents of the data can be comprehended for the first time when all the data recorded beforehand have been read. This is quite impossible with data cards other than that of the present invention, and is, of course, very effective for the preservation of secrecy, the prevention of forgery, etc.

EXAMPLE 5

A slurry in which, to 7 parts of an $Nd_{0.6}Yb_{0.37}Er_{0.03}P_3O_9$ fluorescent material (5 μm in the average grain diameter), there were added 3 parts of a copolymer among vinyl chloride, vinyl acetate and polyvinyl alcohol and 20 parts of a 1:1 mixed solution between methyl isobutyl ketone and acetic acid, was applied on a polyester film to a thickness of 20 μm, to form a tape having a width of ½ inch.

Figure 5:
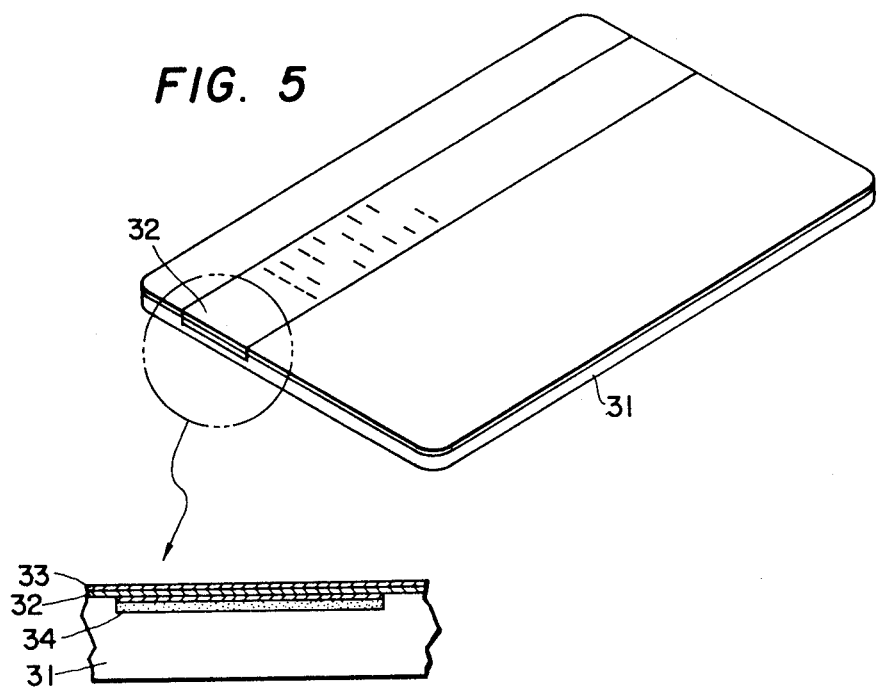
FIG. 5 is a view showing an embodiment of this invention.

As shown in FIG. 5, the tape 34 thus formed was buried by a hot press into a hard polyvinyl chloride plate 31 which was white and opaque.

Numerals and the positive and negative signs can be expressed by combinations of four bars. Using this technique, data were recorded by slotting parts corresponding to the necessary bars. A bar code mask 32 thus obtained was stuck onto the tape 34, and further had its surface covered with a blue sheet 33. Then, a data card was fabricated.

With the data card according to this embodiment, the bar code cannot be discerned with the eye on account of the blue sheet 33.

When a GaAlAs infrared light emitting diode was employed as the exciting source and the combination of a PbS photocell and an interference filter having the peak of transmission factor at 1,540 nm was employed as the detection unit, the data could be read at a correctness of above 99.99%.

What is claimed is:

1. A data card wherein data are recorded with a powdery infrared-infrared fluorescent material, said infrared-infrared fluorescent material being at least one member selected from the group consisting of a fluorescent material containing neodymium; a fluorescent material containing neodymium and ytterbium; a fluorescent material containing ytterbium and erbium; and a fluorescent material containing neodymium, ytterbium and erbium.

2. A data card according to claim 1, wherein at least two sorts of data are recorded with at least two sorts of said infrared-infrared fluorescent materials which differ in the wavelengths of light for excitation and/or light to be emitted.

3. A data card according to claim 1, wherein said data is recorded in a portion of said data card containing said infrared-infrared fluorescent material and the recorded data in the data card are covered with a film which is substantially opaque to visible rays.

4. A data card according to claim 1, wherein said data are recorded on a support containing said infrared-infrared fluorescent material.

5. A data card according to claim 1, wherein said data are recorded in a film containing said infrared-infrared fluorescent material on a support.

6. A data card according to claim 1, wherein the maximum absorption wavelength of said fluorescent material containing neodymium is approximately 800 nm, and the maximum emission wavelength thereof is approximately 1,050 nm.

7. A data card according to claim 1, wherein the maximum absorption wavelength of said fluorescent material containing neodymium and ytterbium is approximately 800 nm, and the maximum emission wavelength thereof is approximately 980 nm.

8. A data card according to claim 1, wherein the maximum absorption wavelength of said fluorescent material containing ytterbium and erbium is approximately 970 nm, and the maximum emission wavelength thereof is approximately 1,540 nm.

9. A data card according to claim 1, wherein the maximum absorption wavelength of said fluorescent material containing neodymium, ytterbium and erbium is approximately 800 nm, and the maximum emission wavelength thereof is approximately 1,540 nm.

10. A data card according to claim 1, wherein said fluorescent material contains neodymium, neodymium and ytterbium, ytterbium and erbium, or neodymium, ytterbium and erbium as constituent elements in inorganic compounds.

11. A data card according to claim 10, wherein said inorganic compounds are phosphates, borates or tungstates.

12. A data card according to claim 1, wherein the maximum absorption wavelength of said fluorescent material is at least approximately 800 nm and the maximum emission wavelength thereof is no more than approximately 1540 nm.

13. A data card according to claim 1, wherein the quantity of neodymium; neodymium and ytterbium; ytterbium and erbium; or neodymium, ytterbium and erbium contained within the fluorescent material is in a range of from 2–100 atomic percent as cation elements other than those constituting oxygen acid.

14. A data card according to claim 13, wherein the quantity is from 10–100 atomic percent.

15. A data card wherein data are recorded with an infrared-infrared fluorescent material, said material consisting of at least one member selected from the group consisting of a fluorescent material containing neodymium and ytterbium, a fluorescent material containing ytterbium and erbium, and a fluorescent material containing neodymium, ytterbium and erbium.

16. A method of recording information on a data card and of determining the information recorded on the data card which comprises recording data in a thin layer of a powdery infrared-infrared fluorescent material having appropriate configuration on a surface of said data card; irradiating the side of the data card containing the infrared-infrared fluorescent material with infrared rays of one wavelength thereby causing said infrared-infrared fluorescent material to emit infrared rays of another wavelength, introducing the emitted infrared rays to a means for producing a signal indicative of said data and introducing the signal into a means for converting the signal into a display corresponding to the data recorded on said data card.

17. The method according to claim 16, wherein said infrared-infrared fluorescent material is at least one member selected from the group consisting of a fluorescent material containing neodymium; a fluorescent material containing neodymium and ytterbium; a fluorescent material containing ytterbium and erbium; and a fluorescent material containing neodymium, ytterbium and erbium.

* * * * *